(12) United States Patent
Weber et al.

(10) Patent No.: US 8,267,137 B2
(45) Date of Patent: Sep. 18, 2012

(54) HOT PLATE WELDING SYSTEM

(75) Inventors: Wolfgang Weber, Windsor (CA); David Woods, Windsor (CA)

(73) Assignee: SPM Automation (Canada) Inc., Windsor, Ontario (CA)

( * ) Notice: Subject to any disclaimer, the term of this patent is extended or adjusted under 35 U.S.C. 154(b) by 57 days.

(21) Appl. No.: 12/929,722

(22) Filed: Feb. 11, 2011

(65) Prior Publication Data

US 2012/0205049 A1 Aug. 16, 2012

(51) Int. Cl.
*B32B 37/00* (2006.01)

(52) U.S. Cl. ...... 156/359; 156/378; 156/581; 156/583.1

(58) Field of Classification Search ............ 156/359, 156/378, 499, 580, 581, 583.1
See application file for complete search history.

(56) References Cited

U.S. PATENT DOCUMENTS

| | | | |
|---|---|---|---|
| 5,614,118 A | 3/1997 | Weber | |
| 6,313,440 B1 | 11/2001 | Weber | |
| 6,491,786 B2 * | 12/2002 | Moench | 156/583.1 |
| 8,007,612 B2 | 8/2011 | Oxenfarth | |

* cited by examiner

Primary Examiner — James Sells (57) ABSTRACT

A welding system for heat welding a component to the contact surface workpiece is provided with a carriage and a component holding positioning unit and workpiece melting unit. The component holding unit and workpiece melting unit each include a respective hooked-shaped holding arm assembly and an associated support assembly used to secure and movably mount the holding arm assembly and an associated support assembly used to secure and movably mounted the holding arm assembly to the carriage. A heating or welding unit is mounted towards a distal end of the holding arm assembly, and which is operable to melt the contact surface when moved thereagainst. The component holding unit is provided with a component holder operable to fixedly grasp or release the selected component in its mounting to the workpiece. The carriage is provided for rotatable movement relative to a rotation axis to selectively move the component holding unit and workpiece melting units between melt operations position, wherein the heating or welding unit is brought into contact with the workpiece and activated to soften or partially melt the contact surface in advance of the component being moved thereagainst; and a fixture placement position, where the component holder moves the component into juxtaposition with the softened contact surface to cool and fuse with the workpiece.

23 Claims, 8 Drawing Sheets

HOT PLATE WELDING SYSTEM

SCOPE OF THE INVENTION

The present invention relates to a welding system for use in securing a component to a workpiece, and more preferably a welding system which is adapted to join components and workpieces made of thermoplastic or other heat fusible materials.

BACKGROUND OF THE INVENTION

Various hot plate welding apparatus are known for fusing together heat weldable components and workpieces. Typically such devices incorporate a hot plate which by thermal contact melts part of the component and/or the workpiece to a partially melted or tacky state. After such partial melting, the component and workpiece are moved into physical contact and cooled, fusing together and forming the finished article.

Frequently such hot plate welders are used in the final production of blow molded thermoplastic products, such as plastic gas tanks and fluid containers as are used in automobiles or as brake, antifreeze and/or washer fluid reservoirs. Conventional hot plate welding systems typically incorporate a movable hot plate which is brought into bearing contact against the outer bottom, side or top wall (hereinafter collectively referred to as the sidewall) of a formed or molded workpiece to effect the partial melting of a contact surface to which a selected component is to be joined. Following the initial melting, the hot plate is then moved to a remote location, and the selected component, such as a plastic seal plug, filler neck, bracket, vent nipple, blow pin, or the like, is then moved against the contact surface to form the completed product.

While conventional hot plate welding systems have been successfully applied for many different applications, automotive fuel tanks manufactured from HDPE (High Density Polyethylene) have proved to be especially challenging. Low fuel vapor permeation requirements necessitate that the container wall be formed using multiple layers of plastic materials. An EVOH layer, which provides permeation reduction, is typically sandwiched between an inner and outer HDPE layer which are necessary for advantageous physical properties of the fuel tank. Additional layers are typically required so that the EVOH layer can properly bond to the HDPE layers. Ideally, to manufacture an end product with the lowest possible fuel vapor permeation the container wall formed in this fashion should not be disturbed by cutting a hole or any type of opening. However, typical fuel tanks have at least a fill opening and an opening for the fuel delivery module which cannot be avoided, as well as other openings for vent valves and similar type of valves. If additional valves are required one way to avoid having to first cut an opening before welding the valve to the tank sidewall is to attach the valve to the inside of the container.

SUMMARY OF THE INVENTION

To at least partially overcome at least some of the disadvantages associated with prior art welding systems, the present invention relates to an apparatus which in use is adaptable for the mounting and heat fusing of a selected component to a workpiece at a contact surface located either along an interior or exterior portion of the workpiece sidewall. In one preferred mode of operation the welding system includes one or more hooked-shaped support arms which have a size selected to permit their insertion through an access opening formed in the workpiece sidewall to position a heating or welding device and/or a selected component against a contact surface disposed along an interior portion of a hollow workpiece. More preferably the welding system incorporates a pair of hooked-shaped support arms which respectively carry a heating device and a component holding device, and which move to sequentially melt and position a selected component against the contact surface.

Accordingly, an object of the present invention is to provide a welding system which is adapted for use in securing a selected component to a contact surface internally disposed within the interior of a hollow workpiece.

Another object of the invention is to provide a hot plate welding system which includes at least one hot plate welding unit having at least one hot plate carried on a hot plate holding arm and/or a component holding unit having a selectively operable component holder carried on a component holder carrying arm, and wherein the carrying arms are sized for insertion through an access opening formed into the interior of a hollow workpiece, so as to allow the movement of hot plate and/or a component releasably secured in the component holder to be moved against an internal workpiece contact surface.

Another object of the invention is to provide a compact hot plate welding system which allows for the more rapid and efficient partial melting of a workpiece contact surface, and the subsequent positioning of a selected component thereagainst in the production of a finished article.

In yet another object, the present invention seeks to provide an economical welding system which includes both workpiece melting and component holding units, and which is positionable on the arm of a single operational robot, and operable through a series of preprogrammed indexed movement to position and secure a selected component to a workpiece contact surface.

A further object of the invention is to provide a hot plate welding system which is adapted for the simplified mounting on the movable wrist of the robot arm of a 6-axis robot, and which is actuable to both partially melt a workpiece contact surface, and thereafter position and fuse thereto a selected component in the production of a finished product.

To at least partially achieve some of the aforementioned objects, the present invention provides a welding system for fusing or otherwise heat welding a selected component to the contact surface workpiece. Although not restricted, preferably the present invention is adapted to weld or otherwise heat fuse components, such as grade vent valves, other types of valves and valve retaining brackets to a workpiece, and preferably a plastic or composite workpiece. Most preferably the invention is adapted to partially melt and secure a component to an internal contact surface of a blow molded workpiece such as fuel tank or other fluid reservoir, such as those used for brake or washer fluids. Although not essential, at least one, and more preferably both the component and contact surface of the workpiece must be formed from a heat fusible material such as Nylon™, ABS, PVC, HDPE, polypropylene, polyethylene or other suitable thermoplastics. Where the workpiece is preferably oriented with a composite or multi-layer sidewall construction, the contact surface is provided along an interior workpiece sidewall spaced a distance of about between about 5 and 80 cm therefrom from either a cut or preformed access opening.

The welding system is provided with a carriage and at least one of, and preferably both a component holding or positioning unit and workpiece melting unit. The component holding unit and workpiece melting unit each include a respective holding arm assembly and preferably also an associated support assembly used to secure and movably mount the holding arm assembly to the carriage for movement therewith. In the workpiece heating unit a heating or welding unit is mounted towards a distal end of the holding arm assembly. The component holding unit is provided with a component holder which is selectively operable to fixedly grasp or release the selected component in its mounting to the workpiece.

Although not essential one simplified construction, the carriage is provided for rotatable movement relative to a carriage rotation axis to selectively move the component holding unit and workpiece melting units between a number of preprogrammed indexed positions. The indexed positions include a melt operations position, wherein the heating or welding unit is brought into contact with the workpiece and activated to soften or partially melt the contact surface in advance of the component being moved thereagainst; and a fixture placement position, where the component holder moves the component into juxtaposition with the softened contact surface to cool and fuse with the workpiece.

The holding arm assemblies may take a number of shapes and/or forms. Preferably, each holding arm assembly includes at least one rigid hooked or curved holding arm. The holding arms extend or are otherwise positionable in an extended orientation so as to generally project outwardly and curve radially relative to the carriage rotation axis. More preferably, the holding arms have a size and curvature selected to allow for their substantially unhindered sliding insertion at least part way through a workpiece access opening, to move the heating device and/or component holder associated therewith into general alignment with the contact surface. Although not required, to provide a more compact construction, the curved holding arms may be mounted for pivoting movement relative to the carriage axis, so as to be positionable in both the extended position and a retracted position wherein the outer holding arm ends are pivoted inwardly towards the rotation axis. In an optimum configuration, the holding arms of both the welding unit and the holding component unit are mounted to the carriage and have a corresponding shape and curvature selected such that if both simultaneously extended, the holding arms orient in a generally S-shaped orientation symmetrically through the carriage rotation axis.

Preferably, the component-holding unit has a similar construction to the workpiece welding unit, with each including a linear slide assembly. The component holder operable to releasably grip and transport a selected seal plug component from a seal plug supply station optionally to a preheating station and then into juxtaposed alignment with the contact surface, for heat fusing thereto.

In a preferred use of the welding apparatus, the heating device is initially used to soften and/or partially melt the contact surface. To move the heating device to the melt operations position, the heating device holding arm is extended, and the carriage is first moved to an initial melt-start position with the carriage raised and the heating device initially aligned over the access opening. The carriage is next lowered towards the access opening while rotating forwardly about its rotation axis, to slide the heating device and its associated holding arm through the access opening to a pre-melt position, with the heating device in general alignment with the melting contact surface. To soften or otherwise partially melt the contact surface, the heating device is activated and then moved to the melt operation position, against and preferably partially into the contact surface. Movement of the heating device against the contact surface may be effected by the displacement of the carriage, as for example by its mounting on a suitable gantry frame or robot arm. More preferably, however, the support assembly securing the holding arm to the carriage includes one or more linear slides which allow for the selective relative movement of the holding arm assembly relative thereto. Following contact surface melting, the carriage is rotated in a reverse direction and raised withdrawing the heating device and its associated holding arm from the workpiece interior in the reverse operation.

Immediately following the heating device withdrawal and with the component holding arm extended, the carriage is rotated to move the component holder with the component secured thereby into initial compound alignment over the access opening. Further forward rotation of carriage about the rotation access while the carriage moves towards the access opening moves the component holder and the component into the workpiece interior to a pre-placement position, wherein the component is generally in alignment with the partially melted contact surface. The component holder arm is then moved towards the contact surface, to position the component in a fixture placement position against the melted contact surface, and thereafter allowed to cool, fusing the component to the workpiece.

Following final positioning of the component, the component is released and the carriage is again rotated in the reverse direction and raised to withdraw the component holder and its associated holding arm from the workpiece interior.

Accordingly, in one aspect the present invention resides in a hot plate welding system for melt connecting a component to a contact surface of a workpiece having an access opening spaced therefrom, the system including: a component mounting assembly comprising a carriage, a component holding unit and workpiece melting unit, each of the component holding unit and workpiece mounting unit being secured to said carriage for movement therewith, the workpiece melting unit including: a heating device, a hooked heater-holding arm, and a heater-holding arm support, the hooked heater-holding arm curving in a first plane from a proximal end portion to a distal end portion and being sized for sliding insertion through said access opening, the heating device being secured towards the distal end portion of the heater-holding arm and being sized for insertion through said access opening the heating device being activatable to partially melt or soften the contact surface of the workpiece, the distal end portion of the heater-holding arm being selectively movable in said first plane along an associated generally radially extending path between a melt start position, where said distal end of the heater-holding arm is positioned adjacent to said access opening, and an extended pre-melt position, where said heater-holding arm is moved through said access opening to a position with said heating device in general alignment with said contact surface, the component-holding unit including a component holding device, a hooked component-holding arm and a component holding-arm support, the component-holding arm curving in said first plane from a proximal end portion to a distal end portion and being sized for sliding insertion through said access opening, the component-holding device being secured towards the distal end portion of the component-holding arm and sized for insertion through said access opening, the distal end portion of the component-holding arm being selectively movable in said first plane along an associated generally radially extending path between a component-feed position, where said distal end of the component-holding arm is positioned adjacent said access opening, and an extended pre-mount position, where said component-holding arm is moved through said access opening to a position with said component-holding device in general alignment with the contact surface.

In another aspect, the present invention resides in a welding system for forming a weld connection between a contact surface of a workpiece and a component to be connected thereto, the system including: a component mounting assembly comprising a carriage, a component holding unit and workpiece melting unit, each of the component holding and workpiece mounting units being mounted to said carriage, the workpiece melting unit including a workpiece welding device, and a welding-unit holding arm which curves from a proximal end to a distal end, and a first arm support, the welding device secured towards the distal end of the welding-unit holding arm and being activatable to melt and/or soften the contact surface, the welding-unit holding arm being pivotally coupled to the first arm support member for selective movement about an associated pivot between a first position wherein the distal end of the welding-unit holding arm is moved outwardly to a remote position relative to the carriage and second position where the distal end is moved inwardly relative thereto, the component-holding unit including: a component holder, a component-holding arm which curves along a length portion between a proximal end to a distal end, and a component arm support member, the component holding arm being pivotally coupled to said component arm support member for selective movement about an associated pivot between a first position wherein the distal end is moved inwardly relative thereto.

In a further aspect, the present invention resides in a hot plate welding system for forming a plastic weld connection between an internal contact surface of a generally hollow workpiece and a component to be connected to the contact surface, the workpiece having an access opening spaced from the contact surface, the system including: a component mounting assembly comprising a carriage, a component holding unit and workpiece melting unit, at least one of the component holding and workpiece mounting unit being mounted to said carriage for movement therewith, the workpiece melting unit including: a hooked heater-holding arm, the hooked heater holding arm curving in a first plane from a proximal end portion to a distal end portion and being sized for sliding insertion through said access opening, a hot plate mounted at the distal end portion of the heater-holding arm, and sized for insertion therewith through said access opening, the hot plate being activatable to partially melt or soften the contact surface, a first actuator operable to effect non-linear movement of the distal end portion generally in said first plane between a melt-operation start position, where said hot plate is moved outwardly an interior of the workpiece and adjacent to said access opening, and a pre-melt position, where said hot plate is moved through said access opening to a position in general alignment with said contact surface, the component-holding unit including: a hooked component-holding arm curving in said first plane from a proximal end portion to a distal end portion and being sized for sliding insertion through said access opening, a component holder mounted towards the distal end portion of the component-holding arm and sized for insertion therewith through said access opening, the component holder being selectively operable to fixedly retain or release the component, a second actuator operable to effect non-linear movement of the distal end portion of the component-holding arm in said first plane between a component-feed position, where said component holder is moved outwardly from the interior of the workpiece adjacent said access opening, and a pre-mount position, where said component holder is moved through said access opening to a position in general alignment with the contact surface.

BRIEF DESCRIPTION OF THE DRAWINGS

Reference may now be had with the following description taken together with accompanying drawings in which.

DETAILED DESCRIPTION OF THE PREFERRED EMBODIMENTS

The present invention relates to a hot plate welding system 10 used in the securement of a component, such as a valve bracket 12, to a desired contact surface 14 disposed along the interior sidewall 16 of a hollow fuel tank preform 18. In a most preferred use, the preform 18 is blow molded with the sidewall 16 being of a multi-layer of composite construction which defines a hollow interior 20, and which includes a multi-layer sidewall construction incorporating HDPE and EVOH layers. Although not essential, preferably the valve bracket 12 is formed from HDPE for optimum melt welding and fusing to the contact surface 14. An access opening 22 is formed through the sidewall 16 at a laterally spaced distance of between about 5 and 80 cm, and more preferably 20 to 50 cm from the contact surface 14.

Figure 1:
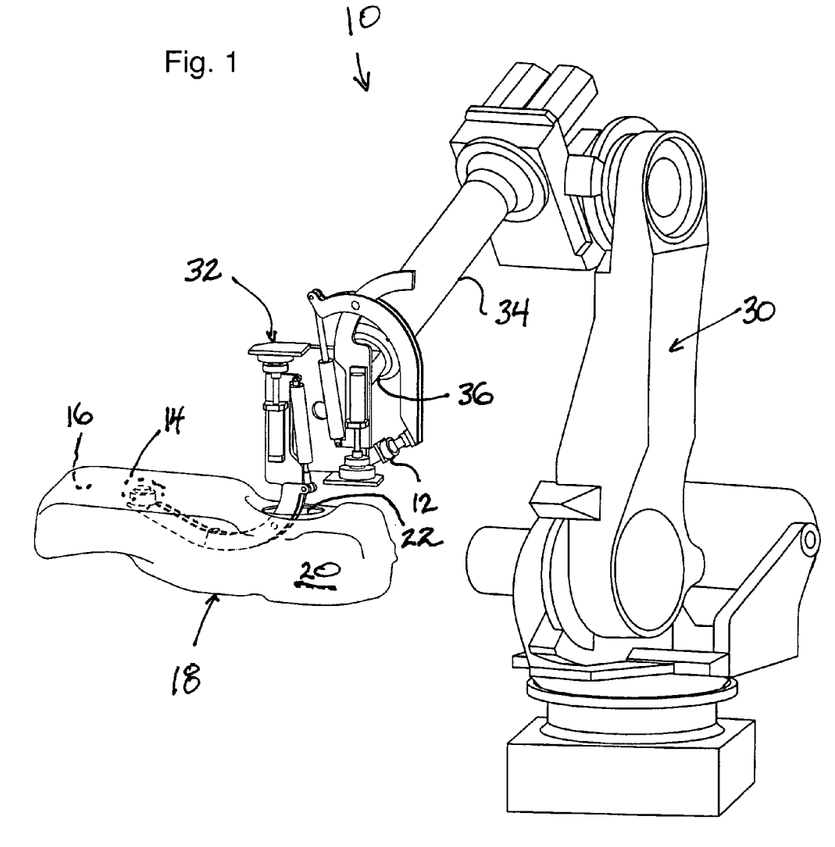
FIG. 1 shows a perspective view of a hot plate welding system used in the positioning and securement of a valve bracket component to an internal contact surface of a blow molded fuel tank in accordance with a preferred embodiment of the invention.
Figure 2:
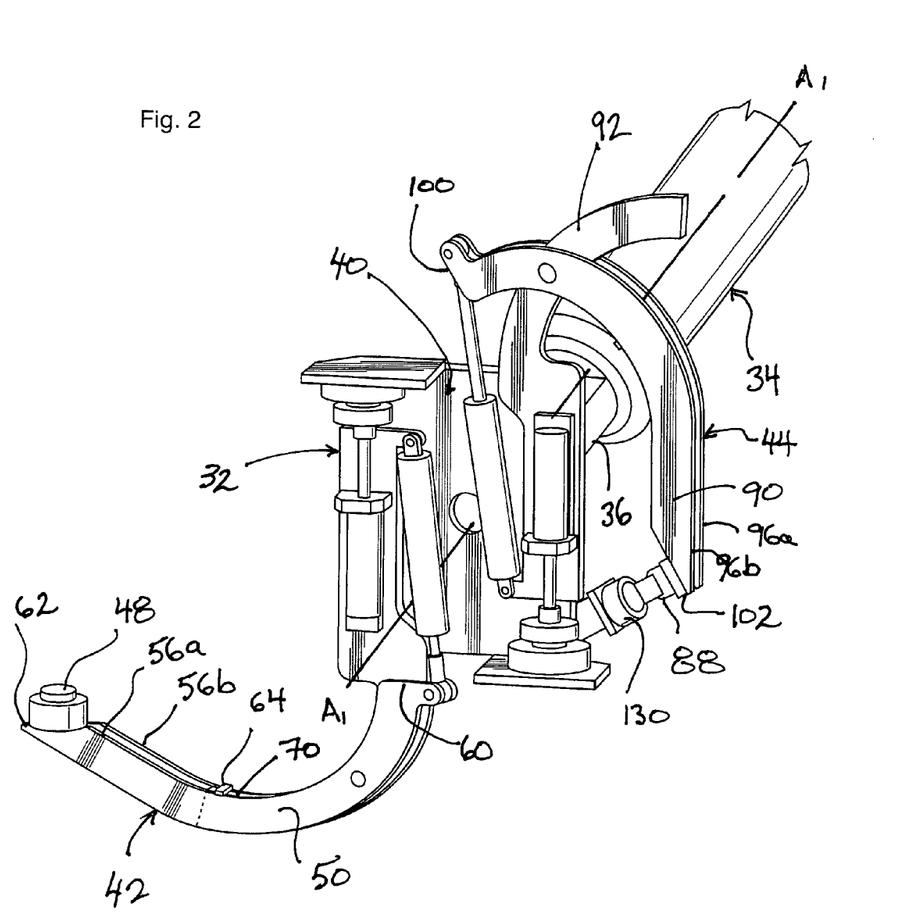
FIG. 2 shows an enlarged schematic view of the component mounting assembly used in the hot plate welding system of FIG. 1.

FIG. 1 shows best the welding system 10 as including a single robot 30 and modular component mounting assembly 32. The robot 30 is provided with a single robot arm 34 which is adapted for preprogrammed indexed movement in 6-axis, and which further includes a terminal-most wrist 36 which is selectively reciprocally rotatable about a rotation axis $A_1$-$A_1$ (FIG. 2). As shown in FIG. 1, the component mounting assembly 32 is coupled to the robot arm wrist 36. In this manner, the component mounting assembly 32 is movable by the robot 30 both in 6-axis movement together with the robot arm 34, and in rotation about the axis $A_1$-$A_1$ with rotary movement of the wrist 36. As will be described, in use the component mounting assembly 32 is indexed in movement through a preprogrammed manufacturing cycle by means of the robot arm 32 through a series of workstations and/or positions to successively grasp, position and fuse to the contact surfaces of successively positioned preforms 18, individual valve bracket 12 in the manufacture of finished fuel tanks.

Figure 3:
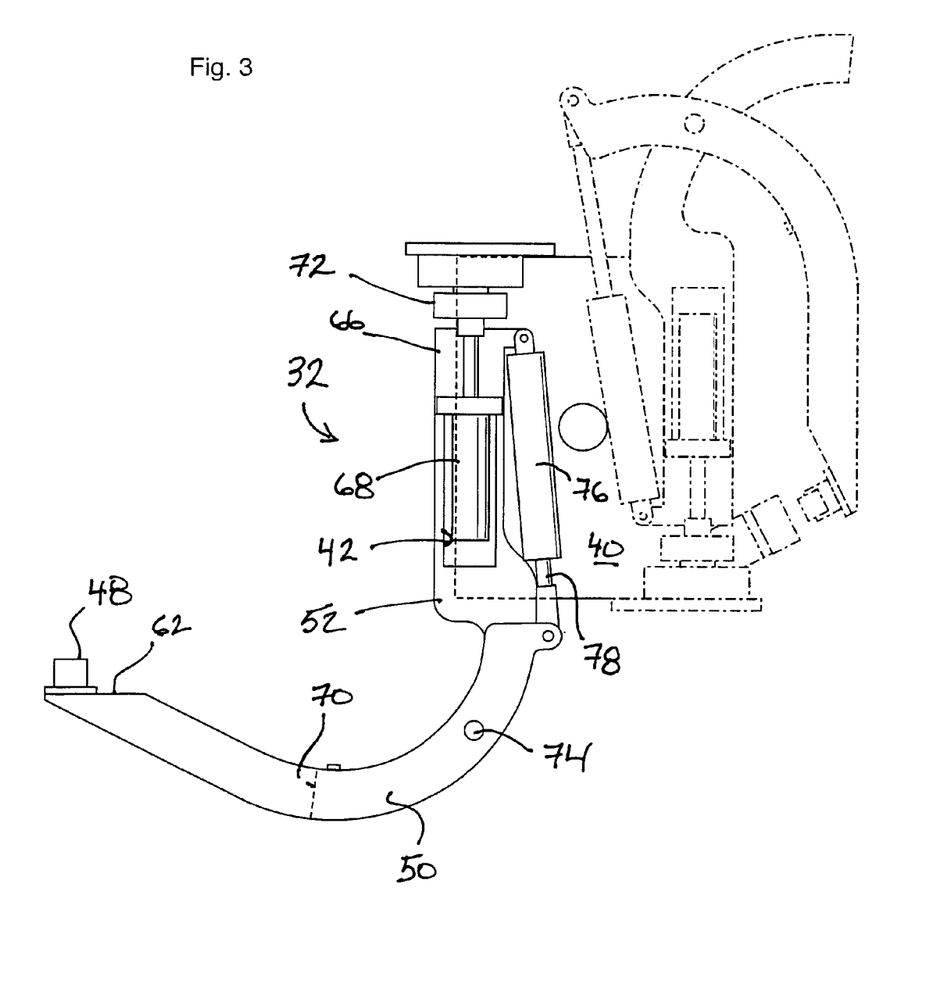
FIG. 3 shows an enlarged perspective view of the workpiece melting unit used in the hot plate welding system of FIG. 1.
Figure 4:
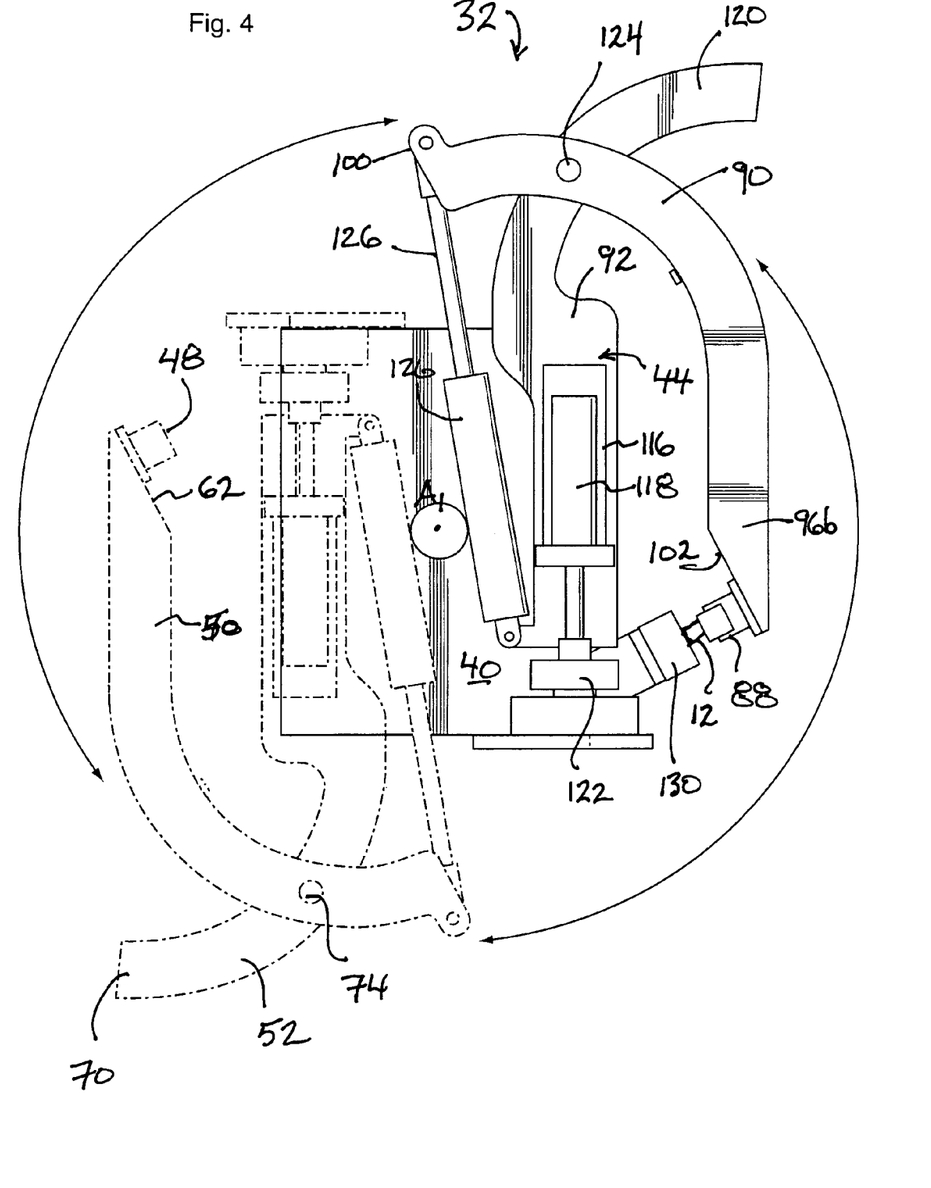
FIG. 4 shows an enlarged partial perspective view of the component-holding unit used in the hot plate welding system of FIG. 1.
Figure 5:
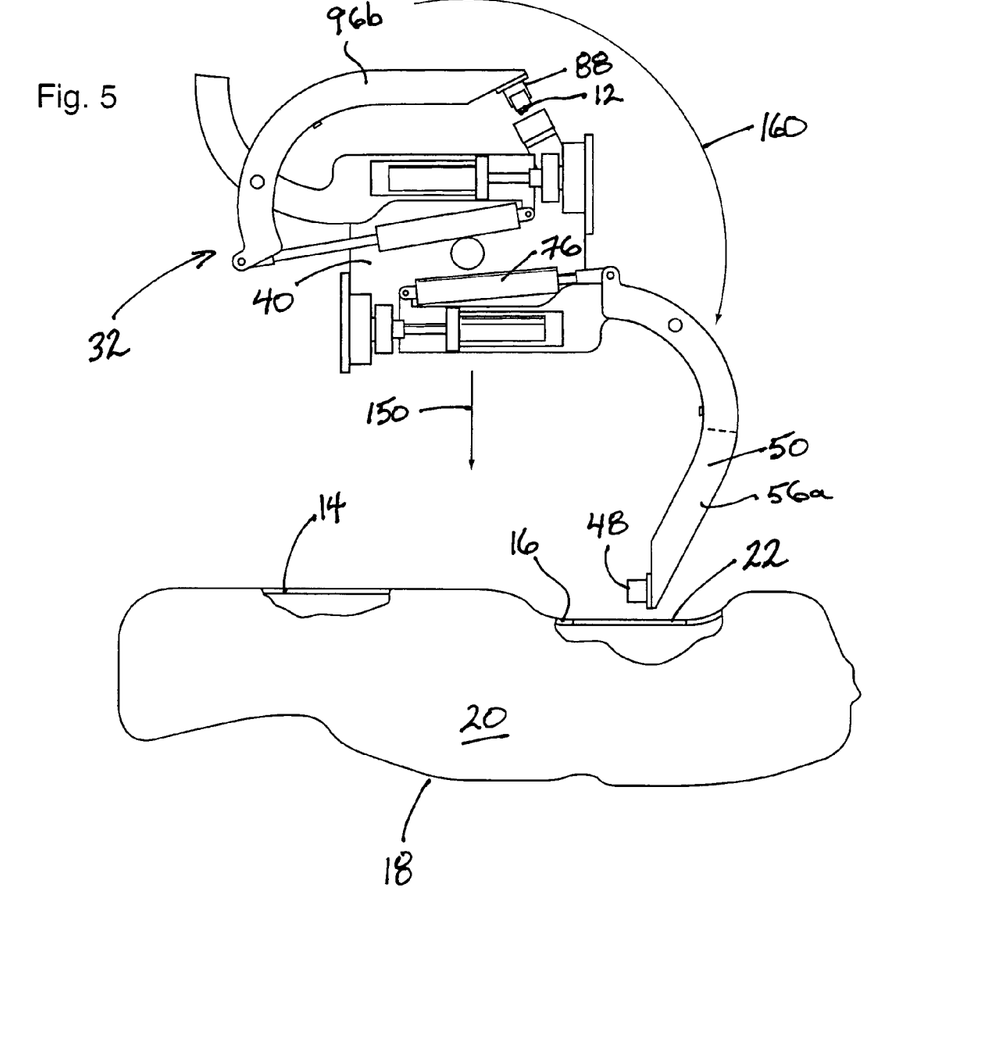
FIG. 5 illustrates the component mounting assembly of FIG. 2 with a hot plate of the workpiece melting unit oriented in an initial melt-start position above a fuel tank access opening.
Figure 6:
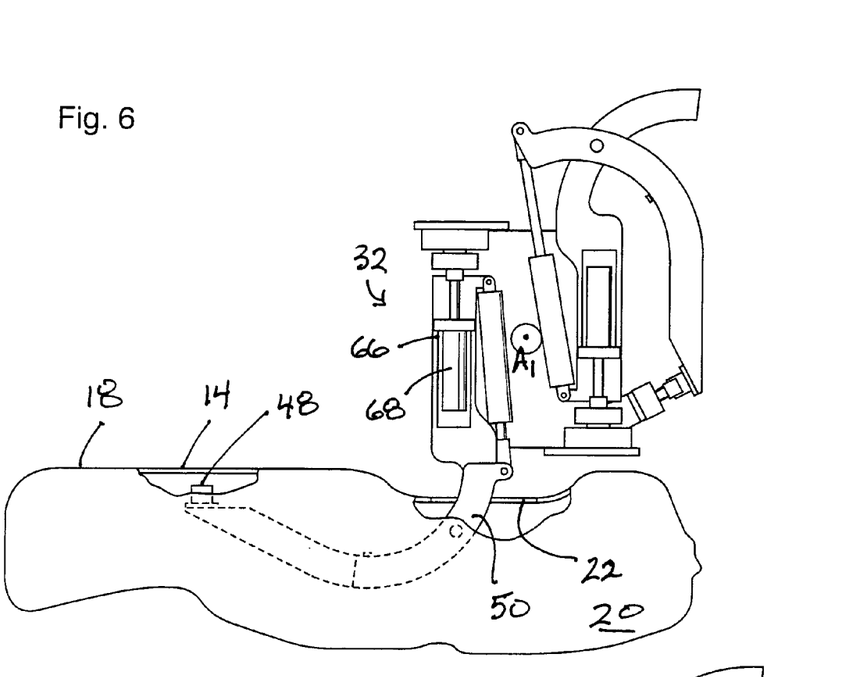
FIG. 6 illustrates schematically the component mounting assembly of FIG. 2 with the hot plate workpiece melting unit moved into the interior of the fuel tank of FIG. 1 in a pre-melt position.

The component mounting assembly 32 is shown best in FIGS. 2 to 4 as including generally rectangular steel carriage plate 40, a workpiece melting unit 42 and a component-holding unit 44. In a simplified form, the carriage plate 40 is formed as a generally planar rectangular aluminum or metal plate which is bolted directly to the end of the wrist 36. The carriage plate 40 is preferably fixedly secured to the wrist 36 at its geometric centre, and in an orientation with the plate 40 extending in a plane generally normal to the axis $A_1$-$A_1$. In this configuration, the rotation of the wrist 36 moves the carriage plate 40 in rotation about the axis $A_1$-$A_1$.

FIGS. 2 and 3 show best the workpiece melting unit 42 as including a hot plate 48, a holding arm assembly 50 and an associated support assembly 52. The holding arm assembly 50 is shown best in FIG. 2 is generally hooked-shape and include a pair of rigid parallel spaced curved arm members 56a,56b. The arm members 56a,56b have the identical shape and profile and extend radially from a proximalmost end 60 along an arc of between about 70 and 120°, and preferably about 90°, merging with a distalmost end portion 62. The arm members 56a,56b are maintained in their fixed spaced apart relationship by one or more metal braces 64 which are positioned to provide the holding arm assembly 50 with sufficient rigidity. As shown best in FIG. 2, the hot plate 48 is secured to the holding arm assembly 50 adjacent to the distalmost end portions 62 of the arms 56a,56b.

The hot plate 48 and hooked arm members 56a,56b have a size and length selected to permit their substantially unhindered sliding insertion through the fuel tank access opening 22 to permit positioning of the hot plate 48 in general alignment with the contact surface 14. As shown best in FIGS. 2 and 3, the support assembly 52 associated with the holding arm assembly 50 includes a linear slide plate 66 a slide actuator 68 and a curved support arm 70.

The linear slide plate 60 is slidably mounted to the carriage plate 40 for linear movement along a line tangential to the axis $A_1$-$A_1$. In this regard, the slide actuator 68, which in a simplified construction may comprise an electric stepping motor or a hydraulic or pneumatic ram is selectively operable to move the slide plate between an initial rest position and a biased position displaced linearly therefrom. As will be described, a load sensor 72 is most preferably electronically coupled to the slide actuator 60 and provides control signals thereto.

Although not essential, most preferably the curved support arm 70 is integrally formed with the linear slide plate 66. More preferably, the support arm 70 is provided as a generally planar arm which has a dimension and curvature generally corresponding to the dimension and curvature of a proximal portion of the arm members 56a,56b.

As shown best in FIGS. 2 and 3, the holding arm assembly 50 is pivotally secured to the support arm 70 by way of a pivot 74. The holding arm assembly 50 is coupled to the support arm 70 with each of the arm members 56a,56b on a respective side thereof, and with the holding arm assembly 50 being rotatable about the pivot 74 in a plane normal to the axis $A_1$-$A_1$ between the extended position shown in FIG. 2, wherein the distalmost ends 62 of the arm members 56a,56b are moved radially outwardly relative to the axis; and the retracted position shown in phantom in FIG. 4, in which the distalmost ends 62 of the arm members 56a,56b are pivoted inwardly towards the axis $A_1$-$A_1$.

As shown best in FIG. 2, in the extended position, the braces 64 are most preferably brought into bearing contact with an interior edge portion of the support arm 70 to provide the workpiece melting unit 42 with enhanced structural rigidity under load forces.

In a preferred construction, a pneumatic cylinder 76 is mounted on the slide plate 66 for sliding movement therewith. The pneumatic cylinder 76 includes an extendable cylinder arm 78 which is in turn secured to the holding arm assembly 50. It is to be appreciated that the activation of the cylinder 76 permits the selective movement of the holding arm assembly 50 between the retracted and extend positions.

FIGS. 2 and 4 show best the component-holding unit 44 as including a component holder 88, a holding arm assembly 90 and an associated support assembly 92. The component-holding unit 44 is secured to the carriage plate 40 in an inverse position to the welding unit 42 and symmetrically opposed thereto about the axis $A_1$-$A_1$. Although not essential, most preferably the holding arm assembly 90 is provided with substantially the identical construction and configuration as the holding arm assembly 50. In this regard, the holding arm assembly 90 is generally hooked-shaped and includes a pair of rigid curved arm members 96a,96b which extend generally normal to the axis $A_1$-$A_1$ from respective proximalmost end portions 100 along an arc of between about 70 and 120°, and preferably 90°, to merge with linear distal end portions 102. The component holder 88 is mounted to the distalmost portion 102 of the arm members 96a,96b. The component holder 88 is selectively actuable to grasp or release the valve bracket 12 in its positioning and securement against the contact surface 14. The component holder 88 and arm members 96a,96b are thus provided with a size and length selected to permit their substantially unhindered sliding insertion through the fuel tank access opening 22 to permit the positioning of the valve bracket 12 in general alignment with the contact surface 14.

The support assembly 92 is formed having substantially the same profile and configuration as support assembly 52. The support assembly 92 includes a linear slide plate 116, a slide actuator 118 and a curved support arm 120. The slide actuator 118 is most preferably of the identical construction of slide actuator 68 and is regulated by an associated load sensor 122 to effect the linear displacement of the slide plate 116 relative to the carriage plate 40 along an associated tangential path. Most preferably, the slide plate 116 is displaceable along a linear direction parallel to the direction of displacement of the slide plate 66.

The curved support arm 120 preferably is provided with the identical configuration as the support arm 70. The holding arm assembly 90 is pivotally secured to the support arm 120 by way of an associated pivot 124 for movement in a plane normal to the axis $A_1$-$A_1$. The holding arm assembly 90 is thus movable between a retracted position wherein the distalmost portions 102 of the arm members 96a,96b are spaced radially inwardly towards the axis $A_1$-$A_1$, and an extended position (shown in FIG. 8) in which the component holder 88 moves outwardly a distance remote therefrom. An associated pneumatic cylinder 126 is mounted to the slide plate 116 for movement therewith. The pneumatic cylinder 126 includes an extensible cylinder arm 128 which is secured to the proximalmost end 100 of at least one of the arm members 96a,96b, and which is selectively extended or retracted to effect movement of the holding arm assembly 90 about the pivot 124.

Although not essential, more preferably the support assembly 92 is further provided with a component hot plate 130. The component hot plate is secured to the slide plate 116 so as to be engagable by and partially melt a selected valve bracket 12 held by the component holder 88 when the holding arm assembly 90 is retracted. It is to be appreciated that the positioning of the component hot plate 130 on the support assembly 92 provides for increased operational efficiencies and allows for the partial melting of the valve bracket 12 during hot plate melting of the preform 18.

The use of the hot plate welding system 10 is described best with reference to FIGS. 5 to 10. In the mounting of a valve bracket 12 to the fuel tank preform 18, the pneumatic cylinder 76 is actuated to move the holding arm assembly 50 to its fully extended position. Simultaneously, the robot 30 (FIG. 1) is actuated to move the carriage plate 40 to the initial melt-start position shown in FIG. 5, wherein the hot plate 48 is positioned directly over the access opening 22, such that the alignment of the contact surface 14 and access opening 22 is parallel with the rotational plane of the arm members 56a,56b and 96a,96b. Concurrently, or immediately prior to the positioning, the valve bracket 12 is secured by the component holder 88 by either its movement to a desired component pick up station, or by a suitable component feed assembly (not shown). From the melt-start position, the robot arm 34 is actuated to simultaneously lower the carriage plate 40 towards the preform 18 in the direction of arrow 150 while effecting its forward rotation about the axis $A_1$-$A_1$ in the direction of arrow 160. It is to be appreciated that the movement of the carriage plate 40 thus effects the sliding movement of the hot plate 48 and holding arm assembly 50 to the pre-melt position shown in FIG. 6, wherein the hot plate 48 is generally aligned with a spaced a marginal distance from the contact surface.

Figure 7:
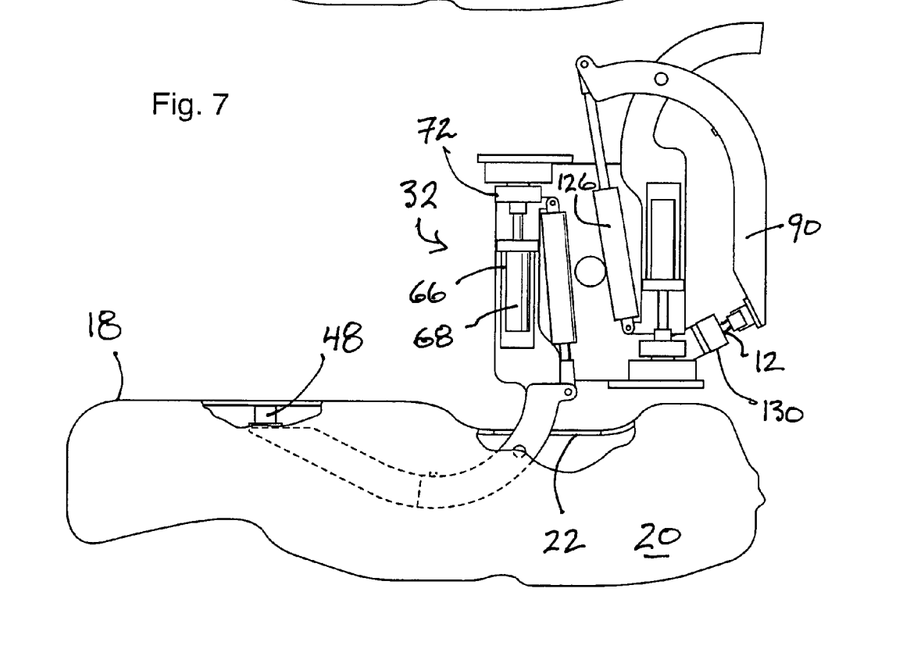
FIG. 7 illustrates schematically the hot plate of workpiece melting unit of FIG. 2 repositioned in a melt operations position during contact surface melting.

Following movement of the hot plate 48 to the pre-melt position, the slide actuator 68 is activated to effect the upward linear movement of the slide plate 66, moving the hot plate 48 into bearing contact with and into the contact surface 14 to effect its partial melting. Most preferably, the load sensor 72 is provided to regulate the degree of melting the contact surface 14. When the sensor 72 senses that the hot plate 48 has been displaced a desired distance into the contact surface 14, the sensors signals the slide actuator 68 to lower and return the linear slide plate 66 to its initial position.

Most preferably, concurrently while the hot plate 48 effects melting of the contact surface, the component hot plate 130 is activated, and the pneumatic cylinder 126 extended to move the valve bracket 12 into melt contact therewith. In this manner, both the preform 18 and valve bracket 12 may be concurrently melted to maximize operating efficiencies.

Immediately following the melting of the preform 18, the robot 30 is again activated to rotate and raise the carriage plate 40 in the reverse directions of arrows 150,160 and effect the sliding withdrawal of the holding arm assembly 50 from the preform interior 20.

Figure 8:
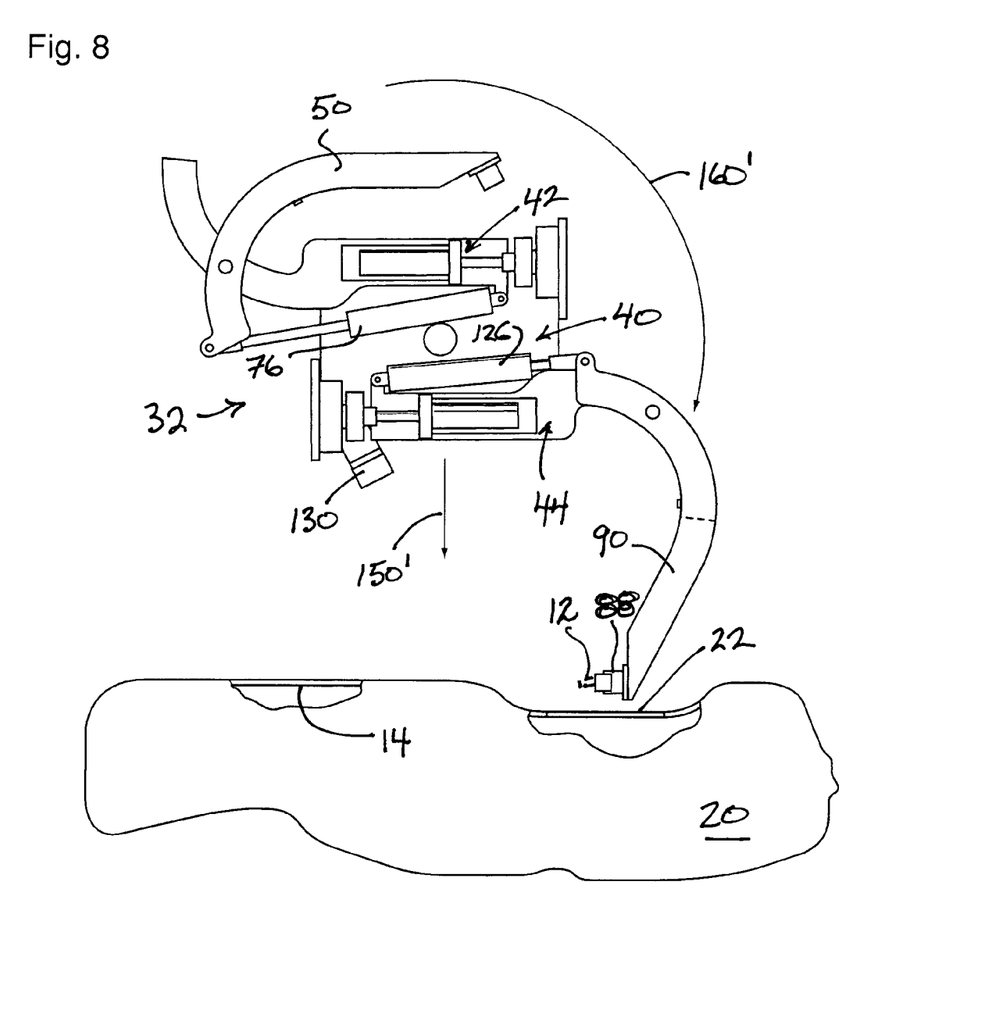
FIG. 8 illustrates schematically the component mounting assembly of FIG. 2 with the component holder of the component-holding unit oriented in a component-start position over the access opening.
Figure 9:
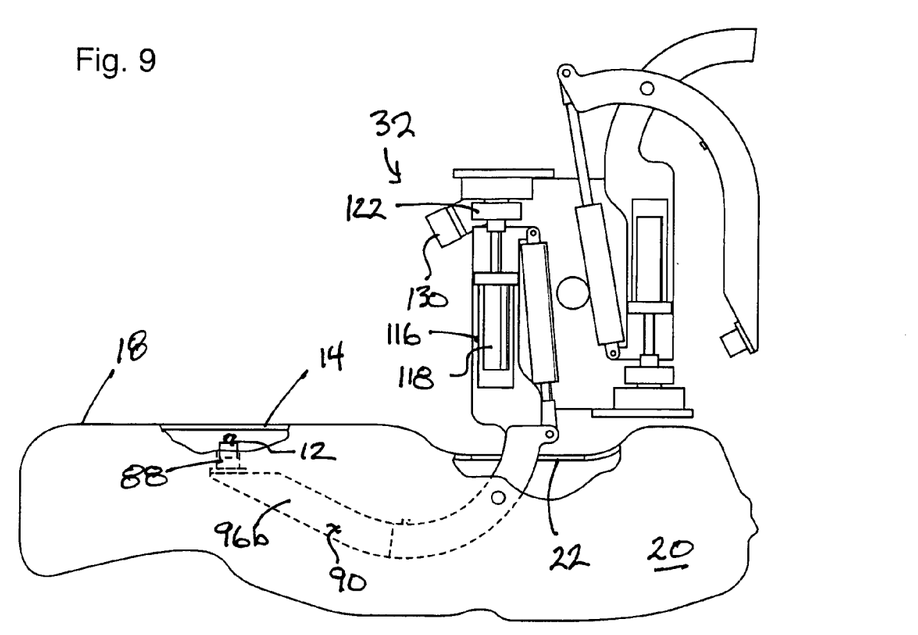
FIG. 9 illustrates schematically the component mounting assembly of FIG. 2 with the component holder and component holding arm moved to an initial pre-placement position.
Figure 10:
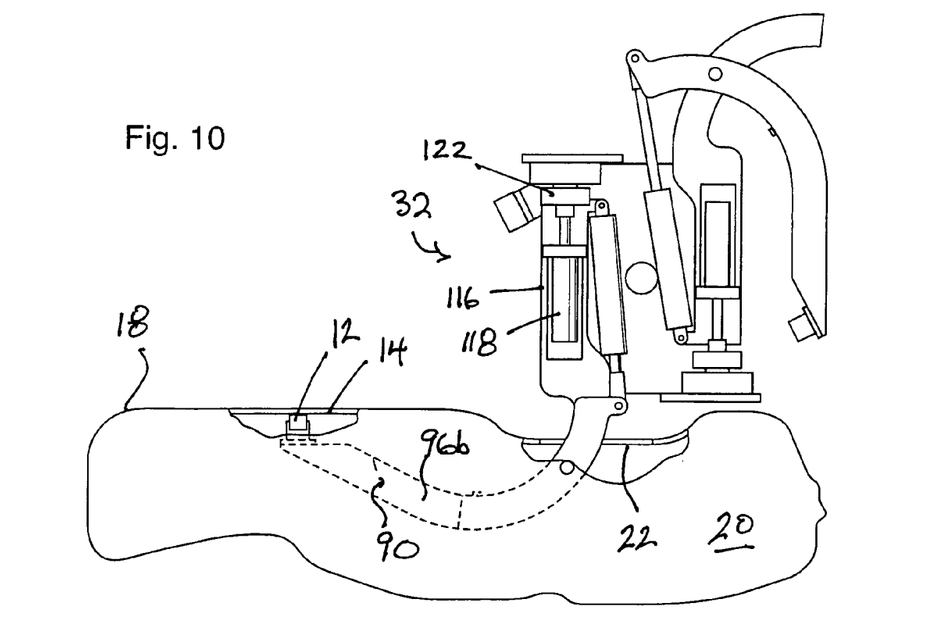
FIG. 10 illustrates schematically the component mounting assembly of FIG. 2 showing the final positioning of component holder in a fixture placement position in the securement of the component against the workpiece contact surface.

Once withdrawn, the pneumatic cylinder 76 is extended to move the holding arm assembly 50 to the retracted position shown in FIG. 8. Concurrently, the pneumatic cylinder 126 is retracted to extend the holding arm assembly 90 of the component holding unit 44 orienting it in the component-start position shown in FIG. 8, in which the valve bracket 12 and component holder 88 are positioned immediately above the access opening 22.

With the component holder 88 so positioned, the robot 30 (FIG. 1) is indexed to again lower the carriage plate 40 in the direction of arrow 150', while effecting its forward rotation in the direction of arrow 160', to rotate and slide the component holder 88 and holding arm assembly 90 into the preform interior 20. The component holder 88 and holding arm assembly 90 are moved inwardly until the valve bracket 12 assumes the pre-placement position shown in FIG. 9, aligned with and adjacent to the melted contact surface 14. Once so positioned, the slide actuator 118 is activated to effect linear upward movement of the slide plate 116 and arm members 96a,96b to move the valve bracket 12 against the contact surface 14. Following either a predetermined period of time and/or on sensing a preselected load, the load sensor 122 signals the slide actuator 118 to return the slide plate 116 to the deactivated position, and the robot arm 34 is rotated and raised in the reverse direction of arrow 150',160' and raised to effect the sliding withdrawal of the component holder 88 and arm assembly 90 from the preform interior 20.

Following the withdrawal of the hot plate welding system 10 from the interior 22 of the preform 18, the manufacturing cycle is repeated for the manufacture of subsequent fuel tank products.

Although the detailed description describes the use of pneumatic cylinders 76,126 to effect the extension or retraction of the holding arm assemblies 50,90, the invention is not so limited. Other means of effecting holding arm movement such as electric motors or other hydraulic cylinders could also be used and will now become apparent. Further, although the pivotal movement of the holding arm assemblies 50,90 advantageously provides a welding system 10 having a more compact and space efficient profile, it is to be appreciated that the curved arm members 56,96 could be rigidly secured to the carrier plate 40.

Although the detailed description describes the arm members 56,96 as curving and rotatable in a common plane generally normal to the rotation axis $A_1$-$A_1$ as allowing for simplified programmed movement, it is to be appreciated that other arm configurations could also be provided.

Although the detailed description describes the preferred aspect of the invention as used to position a valve bracket 12 to an interior contact surface 14 of a gas tank preform 18, the invention is not so limited. The present apparatus is equally suited for use in the securement of a variety of different types of components to the interior or exterior surface of other types of blow molded, injection molded and/or cast workpieces.

Although the hot plate welding system 10 describes the mounting of the workpiece melting unit 42 and component-holding unit 44 on a single carriage plate 40, in a less preferred construction, the melting unit 42 and component-holding unit 44 could be mounted to separate carriages, each secured to a dedicated robot or robot arm for independent movement.

While the detailed description describes the use of load cells or load sensors 72,122 to limit movement of the slide plates 66,116 the invention is not limited. Other activating/deactivating devices could also be used and will now become apparent. By way of non-limiting example, instead of a load cells 72 and/or 122 a spring loaded trigger mechanism could be provided. The spring trigger mechanism need not provide force feedback, but may operate on a sensor once the spring is compressed by the hot plate and/or component making contact with the fuel tank wall.

Although the detailed description describes and illustrates various preferred aspects, the invention is not so limited. Many variations and modifications will now occur to persons skilled in the art. For a definition of the invention, reference may be had to the appended claims.

We claim:

1. A hot plate welding system for melt connecting a component to a contact surface of a workpiece having an access opening spaced therefrom, the system including:
   a component mounting assembly comprising a carriage, a component holding unit and workpiece melting unit, each of the component holding unit and workpiece mounting unit being secured to said carriage for movement therewith, the workpiece melting unit including:
   a heating device, a hooked heater-holding arm, and a heater-holding arm support,
   the hooked heater-holding arm curving in a first plane from a proximal end portion to a distal end portion and being sized for sliding insertion through said access opening,
   the heating device being secured towards the distal end portion of the heater-holding arm and being sized for insertion through said access opening the heating device being activatable to partially melt or soften the contact surface of the workpiece,
   the distal end portion of the heater-holding arm being selectively movable in said first plane along an associated generally radially extending path between a melt start position, where said distal end of the heater-holding arm is positioned adjacent to said access opening, and an extended pre-melt position, where said heater-holding arm is moved through said access opening to a position with said heating device in general alignment with said contact surface,
   the component-holding unit including a component holding device, a hooked component-holding arm and a component holding-arm support,
   the component-holding arm curving in said first plane from a proximal end portion to a distal end portion and being sized for sliding insertion through said access opening, the component-holding device being secured towards the distal end portion of the component-holding arm and sized for insertion through said access opening,
   the distal end portion of the component-holding arm being selectively movable in said first plane along an associated generally radially extending path between a component-feed position, where said distal end of the component-holding arm is positioned adjacent said access opening, and an extended pre-mount position, where said component-holding arm is moved through said access opening to a position with said component-holding device in general alignment with the contact surface.

2. The hot plate welding system as claimed in claim 1, wherein the carriage is reciprocally movable about a rotation axis extending generally normal to said first plane, whereby rotation of said carriage about said axis selectively move the distal end position of the heater-holding arm and component-holding arm at least partially along their respective associated radially extending paths.

3. The hot plate welding system of claim 1, wherein the heater-holding arm and component-holding arm have substantially the same curvature.

4. The hot plate welding system of claim 2, wherein the heater-holding arm and component-holding arm are each pivotally coupled to said respective heater-holding arm support member and component holding-arm support by an associated pivot spaced towards each arm proximal end, the heater-holding arm and component-holding arm each being mounted for pivoting movement relative to said carriage between a retracted position, wherein the arm distal end portions are moved radially inwardly towards said rotation axis and extended positions wherein the arm distal end portions are moved radially outwardly therefrom.

5. The welding system as claimed in claim 4, wherein the heater-holding arm support member extends substantially the same curvature and profile as a proximal segment of the heater-holding arm, whereby when the heater-holding arm is moved to the extended position, the proximal segment assuming an orientation in substantially juxtaposed alignment with the heater-holding arm support member.

6. The welding system as claimed in claim 5, wherein the heater-holding support member includes a stop member disposed for engaging of the heater-holding arm in said extended position, the stop member limiting further pivoting movement of the heater-holding arm past the extended positions, the workpiece melting unit further including an actuator for selectively pivoting the heater-holding arm between the extended and retracted positions.

7. The welding system as claimed in claim 1, wherein the workpiece melting unit is movably mounted to said carriage by way of a linear slide assembly, the linear slide assembly including a load cell operable to provide feed back information as to at least one of a melt displacement and a contact force between the heating device and the contact surface.

8. The welding system as claimed in claim 6, wherein the actuator comprises a gas cylinder having an extendable cylindrical arm, whereby the selective extension or retraction of the cylinder arm effects movement of said heater-holding arm between said extended and retracted positions, and the workpiece melting unit being secured to said carriage by way of a linear slide assembly having a load cell operable to provide feedback information, wherein when the heater-holding arm is in the pre-melt position, the workpiece melting unit being movable relative to said carriage to effect contact between the heating device and the contact surface as the contact surface is melted.

9. The welding system of claim 1 further including a robot having a 6-axis robot arm, the carriage being secured to an end portion of the robot arm for 6 axis movement therewith.

10. The welding system as claimed in claim 1, wherein the workpiece comprises a hollow blow molded gas tank having an interior cavity delineated by a multilayer sidewall, the sidewall including an EVOH layer and an innermost HDPE layer, the contact surface disposed at said innermost HDPE layer, and said part of the component comprises an HDPE part.

11. The welding system as claimed in claim 4, wherein the component-holding unit further includes a component heating unit, the component heating unit being positioned for engagement by said component when said component-holding arm is moved to its retracted position.

12. A welding system for forming a weld connection between a contact surface of a workpiece and a component to be connected thereto, the system including:
   a component mounting assembly comprising a carriage, a component holding unit and workpiece melting unit, each of the component holding and workpiece mounting units being mounted to said carriage,
   the workpiece melting unit including a workpiece welding device, and a welding unit holding arm which curves from a proximal end to a distal end, and a first arm support, the welding device secured towards the distal end of the welding unit holding arm and being activatable to melt and/or soften the contact surface, the welding unit holding arm being pivotally coupled to the first arm support member for selective movement about an associated pivot between a first position wherein the distal end of the welding-unit holding arm is moved outwardly to a remote position relative to the carriage and second position where the distal end is moved inwardly relative thereto, the component-holding unit including:
a component holder, a component-holding arm which curves in from a proximal end to a distal end, and a component arm support member, the component holding arm being pivotally coupled to said component arm support member for selective movement about an associated pivot between a first position wherein the distal end is moved inwardly relative thereto.

13. The welding system as claimed in claim 12, wherein the component-holding unit further includes a component-heating unit activatable to partially melt and/or soften a part of the component when the component-holding arm is moved towards the second position.

14. The welding system as claimed in claim 12, whereby the carriage is selectively rotatable about a rotational axis wherein each of the arm support members extend as curved members in a common plane extending generally normal to the rotational axis, the welding-unit holding arm and component-holding arm having substantially the same curvature and profile.

15. The welding system as claimed in claim 12, wherein each of the respective support members includes an associated stop member disposed for engaging contact with the welding-unit holding arm and component-holding arm, in said holding arms are in their respective first positions, the associated stop members limiting further pivoting arm movement.

16. The welding system as claimed in claim 11, wherein the workpiece melting unit includes a first gas cylinder having a reciprocally movable actuator arm for selectively pivoting the heater-holding arm, and the component holding unit includes a second gas cylinder having a reciprocally movable actuator arm for selectively pivoting the component-holding arm.

17. The welding system of claim 11, wherein the workpiece melting unit and the component-holding unit are each movably mounted to said carriage by way of an associated slide assembly operable to effect linear displacement of the associated welding device and component holder relative to contact surface.

18. The welding system as claimed in claim 17 further including a robot having a 6-axis robot arm, the carriage being disposed towards an end portion of the robot arm for movement therewith.

19. The welding system as claimed in claim 12, wherein the workpiece comprises a top wall of the hollow blow molded gas tank having an access opening and a multilayer sidewall including a EVOH layer and an innermost HDPE layer, the contact surface disposed on said innermost layer a distance spaced from said access opening, the distal end portions of each of the welding-unit holding arm and component-holding arm, being sized for insertion through said access opening for selectively positioning said welding device and component holder in general alignment with the contact surface.

20. A hot plate welding system for forming a plastic weld connection between an internal contact surface of a generally hollow workpiece and a component to be connected to the contact surface, the workpiece having an access opening spaced from the contact surface, the system including:
a component mounting assembly comprising a carriage, a component holding unit and workpiece melting unit, at least one of the component holding and workpiece mounting unit being mounted to said carriage for movement therewith, the workpiece melting unit including:
a hooked heater-holding arm, the hooked heater holding arm curving in a first plane from a proximal end portion to a distal end portion and being sized for sliding insertion through said access opening, a hot plate mounted at the distal end portion of the heater-holding arm, and sized for insertion therewith through said access opening, the hot plate being activatable to partially melt or soften the contact surface,
a first actuator operable to effect non-linear movement of the distal end portion generally in said first plane between a melt-operation start position, where said hot plate is moved outwardly an interior of the workpiece and adjacent to said access opening, and a pre-melt position, where said hot plate is moved through said access opening to a position in general alignment with said contact surface, the component-holding unit including:
a hooked component-holding arm curving in said first plane from a proximal end portion to a distal end portion and being sized for sliding insertion through said access opening,
a component holder mounted towards the distal end portion of the component-holding arm and sized for insertion therewith through said access opening, the component holder being selectively operable to fixedly retain or release the component,
a second actuator operable to effect non-linear movement of the distal end portion of the component-holding arm in said first plane between a component-feed position, where said component holder is moved outwardly from the interior of the workpiece adjacent said access opening, and a pre-mount position, where said component holder is moved through said access opening to a position in general alignment with the contact surface.

21. The welding system as claimed in claim 20, wherein each of the heater holding arm and component-holding arm being pivotally moveable relative to said carriage between respective retracted position wherein the distal end portions of the arms are moved radially inwardly towards the rotation axis, and extended positions where the arm distal end portions are moved outwardly therefrom,
the workpiece melting unit further includes a first support member extending with substantially the same curvature as a proximal segment of the heater-holding arm, when the heater-holding arm is moved to the extended position, the proximal segment of the heater-holding arm assuming an orientation in substantially juxtaposed alignment with the first support member,
the component mounting unit including a second support member extending with substantially the same curvature as a proximal segment of the component-holding arm, when the component-holding arm is moved to the extended position, the proximal segment of the component holding arm assuming an orientation in substantially juxtaposed alignment with the second support member,
said member includes a stop member disposed for engaging of the heater-holding arm about said associated pivot when in said extended position, limiting further pivoting movement,
the workpiece melting unit further including an actuator for selectively pivoting retracted positions.

22. The welding system as claimed in claim 20, wherein at least one of the workpiece melting unit and component mount unit are disposed on said carriage by way of an associated linear slide, each linear slide including a load cell operable to provide feed back information as to at least one of arm displacement and contact force with the workpiece.

23. The welding system as claimed in claim 22, wherein the first actuators comprises a gas cylinder having an extendable cylindrical arm, whereby the selective extension or retraction of the cylinder arm effects movement of said heater-holding arm between said extended and retracted positions, and the workpiece melting unit being secured to said carriage by way of a linear slide assembly having a load cell operable to provide feedback information, wherein when the heater-holding arm is in the pre-melt position, the workpiece melting unit being movable relative to said carriage to effect contact between the heating device and the contact surface as the contact surface is melted.

* * * * *